United States Patent
Breeuwer et al.

(10) Patent No.: US 8,244,007 B2
(45) Date of Patent: Aug. 14, 2012

(54) SYSTEM AND METHOD FOR REGISTRATION OF MEDICAL IMAGES BASED ON INSUFFICIENTLY SIMILAR IMAGE AREAS

(75) Inventors: Marcel Breeuwer, Eindhoven (NL); Marcel Johannes Quist, Eindhoven (NL); Sander De Putter, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 968 days.

(21) Appl. No.: 11/718,428

(22) PCT Filed: Nov. 8, 2005

(86) PCT No.: PCT/IB2005/053675
§ 371 (c)(1),
(2), (4) Date: May 2, 2007

(87) PCT Pub. No.: WO2006/051488
PCT Pub. Date: May 18, 2006

(65) Prior Publication Data
US 2009/0067692 A1    Mar. 12, 2009

(30) Foreign Application Priority Data
Nov. 10, 2004    (EP) .................................. 04105653

(51) Int. Cl.
*G06K 9/00*     (2006.01)
(52) U.S. Cl. ...................................... 382/128; 382/219
(58) Field of Classification Search ........................ None
See application file for complete search history.

(56) References Cited

U.S. PATENT DOCUMENTS

| | | | |
|---|---|---|---|
| 5,690,106 A * | 11/1997 | Bani-Hashemi et al. | 600/425 |
| 5,926,568 A * | 7/1999 | Chaney et al. | 382/217 |
| 6,268,611 B1 | 7/2001 | Pettersson et al. | |
| 6,363,163 B1 | 3/2002 | Xu et al. | |
| 6,496,594 B1 * | 12/2002 | Prokoski | 382/118 |
| 6,998,841 B1 * | 2/2006 | Tamez-Pena et al. | 324/302 |
| 2003/0146913 A1 | 8/2003 | Shen et al. | |
| 2004/0024295 A1 * | 2/2004 | Cook et al. | 600/310 |
| 2004/0071325 A1 * | 4/2004 | Declerck et al. | 382/128 |
| 2005/0018904 A1 * | 1/2005 | Davis | 382/181 |
| 2006/0074291 A1 * | 4/2006 | Hardy et al. | 600/410 |
| 2008/0049994 A1 * | 2/2008 | Rognin et al. | 382/128 |

OTHER PUBLICATIONS

Penney et al., "A Comparison of Similarity Measures for Use in 2-D-3-D Medical Image Registration", IEEE Transactions on Medical Imaging, vol. 17, No. 4, Aug. 1998, pp. 586-595.*

Sarkar et al., "A Dual Metric Approach Towards Similarity Measurement in Image Registration", Electrical and Computer Engineering, 2005. Canadian Conference on, May 4, 2005, pp. 959-962.*

(Continued)

*Primary Examiner* — Brian P Werner
*Assistant Examiner* — Tahmina Ansari (57) ABSTRACT

The present invention relates to a system (1) and method for registration of medical image (10,11). Furthermore the invention relates to a computer program (5) for registration of medical images (10,11), when the computer program (5) is executed in a computer (2). In order to provide a more accurate registration transformation of medical images it is suggested to detect insufficiently similar areas (14,14',25,26) and to exclude them from the registration by means of an exclusion mask (22,24,27) that indicates which pixels/voxels should not be included during the registration process.

13 Claims, 5 Drawing Sheets

OTHER PUBLICATIONS

By L. Bao et al. "Registration in Digital Subtraction Angiography Using Multiple ROI's" Engineering in Medicine and Biology Society, 1994. Engineering Advances: New Opportunities for Biomedical Engineers. Proceedings of the 16th Annual International Conference of the IEEE, Nov. 3-6, 1994 pp. 502-503 vol. 1 Publ.

Maes F et al: "Medical Image Registration Using Mutual Information" Proceedings of the IEEE, IEEE. New York, US, vol. 91, No. 10, Oct. 2003, pp. 1699-1722, XP008056001 ISSN: 0018-9219 the whole document.

Maintz J B A et al: "A Survey of Medical Image Registration" Medical Image Analysis, Oxforduniversity Press, Oxford, GB, vol. 2, No. 1, 1998, pp. 1-37, XP001032679 ISSN: 1361-8423 the whole document.

Hill D L G et al: "Medical image registration" Physics in Medicine and Biology, Taylor and Francis Ltd. London, GB, vol. 46, No. 3, Mar. 2001, pp. 1-45, XP002288239 ISSN: 0031-9155 the whole document.

By G.P. Penney et al; "A Comparison of Similarity Measures for Use in 2-D-3-D Medical Image Registration" IEEE Transactions on Medical Imaging, Vol. 17, No. 4, August 1998; Authorized licensed use limited to: United States Patent and Trademark Office. Downloaded on Jun. 16, 2010 at 23:52:32 UTC from IEEE Xplore. Restrictions apply.

By Indranil Sarkar et al.; "A Dual Metric Approach Towards Similarity Measurement in Image Registration" The State University of New York at Buffalo Buffalo, NY-1260 e-mail: {isarkar, rsharman} @buffalo.edu Authorized licensed use limited to: United States Patent and Trademark Office. Downloaded on Jun. 16, 2010 at 23:54:44 UTC from IEEE Xplore. Restrictions apply. pp. 1-4.

Rui et al, "An Overview of Medical Image Registration", Computational Intelligence and Multimedia Appilcations, 2003, pp. 385-390.

Wink et al, "3D MRA Coronary Axis Determination Using A Minimum Cost Path Approach", Magnetic Resonance in Medicine, vol. 47, 2002, pp. 1169-1175.

Wink et al, "Vessel Axis Determination Using Wave Front Propagation Analysis", Proceedings Miccai, Utrecht, October 2001, pp. 846-853.

* cited by examiner

SYSTEM AND METHOD FOR REGISTRATION OF MEDICAL IMAGES BASED ON INSUFFICIENTLY SIMILAR IMAGE AREAS

The present invention relates to a system and method for registration of medical images. Furthermore the invention relates to a computer program for registration of medical images, when the computer program is executed in a computer.

Different medical imaging techniques are known. Functional body images, which provide physiological information, can be obtained for example by single photon emission computed tomography (SPECT) and positron emission tomography (PET). Structural images, which provide an anatomic map of the body, can be obtained for example by magnetic resonance imaging (MRI) and X-ray computed tomography (CT). These techniques provide medical images with complementary and occasionally conflicting information.

Image registration, i.e. the matching of anatomically corresponding locations in two or more medical images, is a common technique for obtaining additional information not apparent in the separate images and therefore is of great importance to research, diagnosis, and treatment. The medical images used for registration need not to be the result of medical imaging with different image techniques. Of equal importance is the registration of images resulting from imaging with different image acquisition protocols using the same imaging technique or resulting from repeated imaging (on different moments in time) with the same image acquisition protocol and the same imaging technique.

Each imaging technique and/or image acquisition protocol has its specific advantages and limitations. For example, bone can be very well visualized in detail with CT imaging but is hardly visible in MR images. To take advantage of both modalities, the CT and MR images can be registered to each other, that is, a geometrical transformation can be determined between anatomically corresponding locations in the images. With this transformation the images can be merged, e.g. bone from CT can be visualized in the MR image.

Several image registration techniques have been developed, ranging from rigid, affine to fully non-rigid registration. An overview can be found in the book "Medical Image Registration" by Hajnal, Hill and Hawkes, CRC Press, ISBN 0-8493-0064-9. A variety of solutions exists for the determination of the registration transformation. They are usually based on the iterative optimization of a registration transformation using a similarity measure. Well-know similarity measures are joint entropy, (normalized) mutual information and cross correlation. For example, for a rigid registration, the translation and rotation are determined that optimize the similarity between the images. However, the current approaches only work well if there is indeed sufficient similarity between the images to be registered. It may occur however that significant parts of the images are not at all similar due to, for example, imaging artifacts or specific properties of the acquisition protocol. In this case, these areas will negatively affect the outcome of the registration (suboptimal or wrong registration transformation).

It is an object of the present invention to provide a more accurate registration transformation of medical images, i.e. a better match between anatomically corresponding locations in the images shall be obtained.

This object is achieved according to the invention by a system for registration of medical images, the system comprising a detecting module adapted to detect one or more image areas in a first image, the image areas being insufficiently similar to corresponding image areas of a second image, a masking module adapted to create at least one exclusion mask to specify image pixels/voxels belonging to these insufficiently similar image areas, and a registration module adapted to perform a registration between image areas of the first image which are not included in the exclusion mask and corresponding image areas of the second image.

The object of the present invention is also achieved by a method for registration of medical images, the method comprising the steps of detecting one or more image areas in a first image, the image areas being insufficiently similar to corresponding image areas of a second image, creating at least one exclusion mask to specify image pixels/voxels belonging to these insufficiently similar image areas, and performing a registration between image areas of the first image which are not included in the exclusion mask and corresponding image areas of the second image.

The object of the present invention is also achieved by a computer program for registration of medical images, the program comprising computer instructions to detect one or more image areas in a first image, the image areas being insufficiently similar to corresponding image areas of a second image, computer instructions to create at least one exclusion mask to specify image pixels/voxels belonging to these insufficiently similar image areas, and computer instructions to perform a registration between image areas of the first image which are not included in the exclusion mask and corresponding image areas of the second image, when the computer program is executed in a computer. The technical effects necessary according to the invention can thus be realized on the basis of the instructions of the computer program in accordance with the invention. Such a computer program can be stored on a carrier such as a CD-ROM or it can be available over the internet or another computer network. Prior to executing the computer program is loaded into the computer by reading the computer program from the carrier, for example by means of a CD-ROM player, or from the internet, and storing it in the memory of the computer. The computer includes inter alia a central processor unit (CPU), a bus system, memory means, e.g. RAM or ROM etc., storage means, e.g. floppy disk or hard disk units etc. and input/output units. Alternatively the inventive method could be implemented in hardware, e.g. using one or, more integrated circuits.

A core idea of the invention is to exclude parts of the medical image from the registration process. More precisely, the invention proposes to automatically detect insufficiently similar areas and to exclude them from the registration by means of an exclusion mask that indicates which pixels/voxels should not be included during the registration process. The present invention leads to a more accurate registration transformation of medical images. Images with insufficient similarity can nevertheless be registered with the inventive registration technique without observing wrong results. This invention can be applied to different imaging techniques and image acquisition protocols.

These and other aspects of the invention will be further elaborated on the basis of the following embodiments which are defined in the dependent claims.

According to a preferred embodiment of the invention the insufficiently similar areas are automatically detected by comparing pixel/voxel intensities of corresponding image areas. For example, the pixel/voxel intensity of a certain part of a vessel in a first image is compared to the same part of that vessel in another image. For this purpose the detecting module and/or the computer program is adapted accordingly. The specific method for detection of the insufficiently similar areas has to be selected individually and depending on image attributes, e.g. the kind of anatomical locations shown in the images (e.g. the shape of the object), the used imaging techniques, protocols etc.

According to another embodiment if the invention at least one part of the exclusion mask is created using a predetermined masking scheme, the masking scheme depending on the type of images attributes. With the use of a predetermined masking scheme the creation of the exclusion mask is simplified. For anatomical standard objects, like e.g. vessels or certain organs, standard exclusion masks can be provided.

These and other aspects of the invention will be described in detail hereinafter, by way of example, with reference to the following embodiments and the accompanying drawings; in which.

Figure 1:
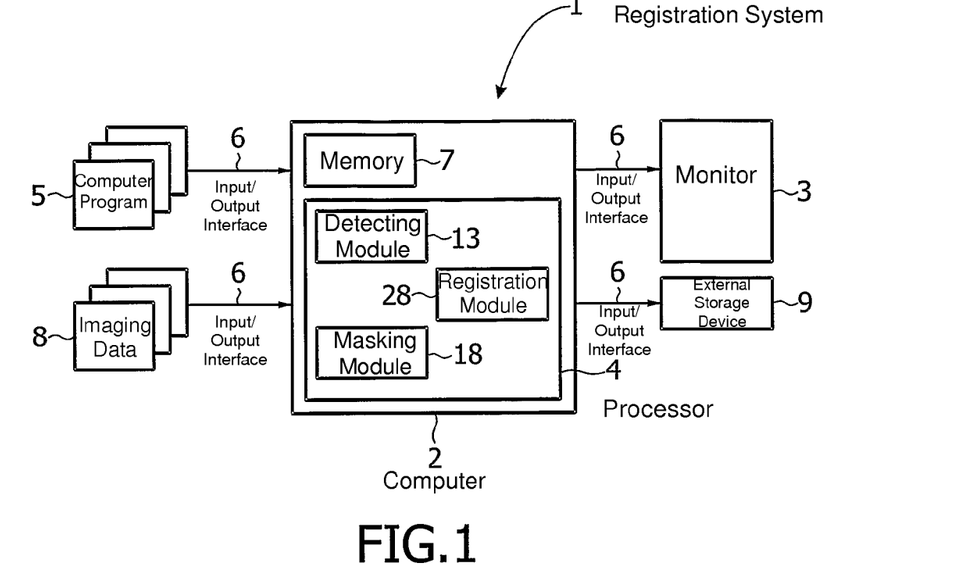
FIG. 1 shows a schematic block diagram of a registration system.

The present invention is illustrated for images of an abdominal aorta aneurysm (AAA). The registration is carried out by means of an registration system 1, which comprises a computer 2, e.g. a general purpose personal computer or a specialized medical computer, and a monitor 3 connected to the computer 2 as illustrated in FIG. 1. The computer 2 comprises a processor 4 adapted to carry out a computer program 5 comprising computer instructions according to the invention, when the computer program 5 is executed in the computer 2. The computer program 5 is transferable to the computer 2 via an input/output interface 6, e.g. a network interface card, and stored in a memory 7, e.g. RAM or ROM, of the computer 2. Imaging data 8 to be processed in the computer 2 are transferred into the computer 2 via the interface 6. Furthermore the computer 2 is adapted for transferring data via the interface 6 to an external storage device 9, a plotter, printer etc. or another computer.

Figure 2:
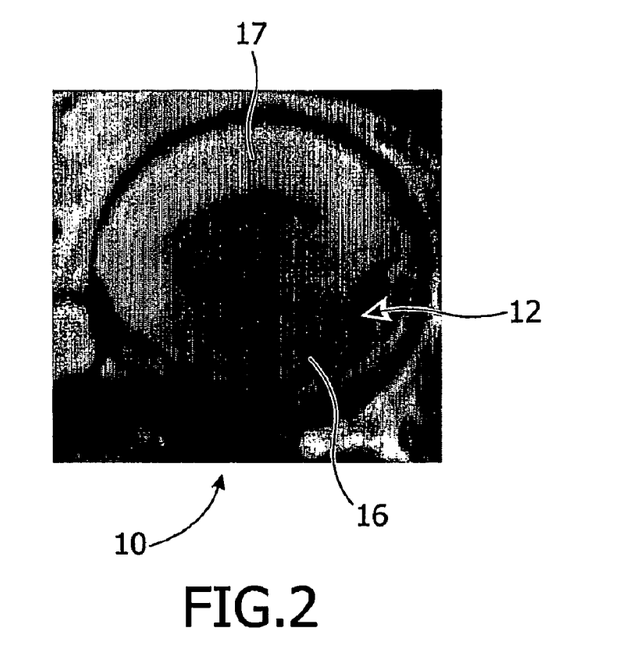
FIG. 2 shows one slice of a 3D BTFE scan of an abdominal aorta aneurysm.
Figure 3:
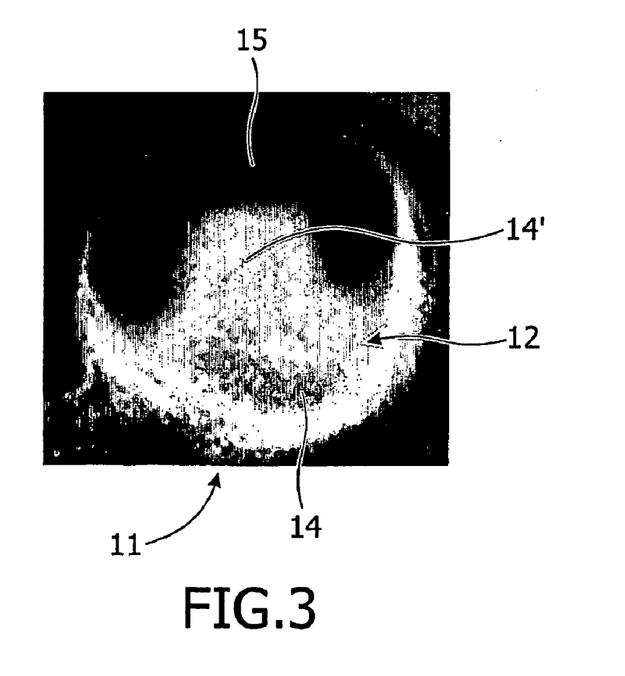
FIG. 3 shows one slice of a M2D TSE scan of the same abdominal aorta aneurysm as in FIG. 2.
Figure 4:
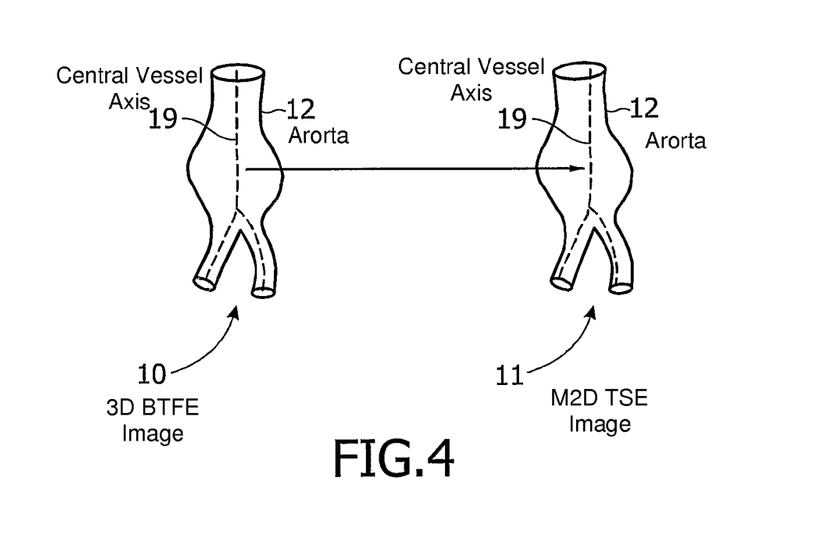
FIG. 4 shows a schematic picture of the copying of the central vessel axis from the 3D BTFE image to the M2D TSE image.

The AAA images are acquired with two different MR image acquisition protocols. FIG. 2 shows an image 10 acquired using a 3D Balanced TFE (BTFE) protocol and FIG. 3 shows an image 11 acquired using a M2D TSE protocol, also called black-blood imaging. FIGS. 2 and 3 show an example of a slice through an aorta 12. After imaging data 8 have been transferred into the computer 2 a segmentation is carried out. In the present embodiment the segmentation is performed as follows: 3D BTFE and M2D TSE images have been acquired in the same scanning session. The patient may have moved slightly during the scan procedure, but this movement will generally not be more than a few Millimeter. For this purpose the centerline of the aorta 12 is detected in the 3D BTFE image 10 using so-called vessel tracking algorithms, as known from O. Wink, W. J. Niessen, B. Verdonck, M. A. Viergever, "Vessel Axis Determination using Wave Front Propagation Analysis", Proceedings MICCAI 2001, Utrecht, 15-17 Oct. 2001 or O. Wink, W. J. Niessen, A. J. Frangi, B. Verdonck and M. A. Viergever, "3D MR Coronary Axis Determination using a Minimum Cost Path Approach", Magnetic Resonance in Medicine 2002, Vol. 47, p. 1169-1175. The detected central vessel axis 19 is then copied to the M2D TSE image 11, where it approximately represents the real central axis. This copy mechanism is illustrated in FIG. 4. At the end of this part of the method an optimal transformation between the two sets of data has been found on the bases of all pixels/voxels.

In a next step the automatic detection of one or more insufficiently similar areas takes place. For this purpose the processor 4 running the computer program 5 serves as a detecting module 13. In the present case the M2D TSE image 11 is chosen for carrying out the detection of insufficiently similar areas, because this image obviously comprises more image artifacts as the 3D BTFE image 10, which does not contain any disturbing artifacts. Therefore no masking is carried out for the 3D BTFE image 10. In the M2D TSE image 11 e.g. an area 14 exists in the lower right of the aorta, this area being brighter compared to the upper dark area 15. On the other hand, the lower right area 16 in the 3D BTFE image 10 appears in approximately the same intensity as the upper area 17 in the same image. In other words the pixel intensities of image areas 14, 15 in the M2D TSE image 11 does not show the same correlation as in the 3D BTFE image 10. The bright area 14 in the M2D TSE image 11 is therefore characterized as an insufficient similar area. Using image processing algorithms computing the pixel intensities of both images 10, 11 all insufficiently similar areas are determined and are labeled for subsequent processing.

The exclusion mask to specify image pixels belonging to insufficiently similar image areas is now constructed in a way, that it specifies which image pixels belong to those areas. For this purpose the processor 4 running the computer program 5 serves as a masking module 18. The M2D TSE image 11 in FIG. 3 contains a large area 14 in which the lumen (blood) is not "black". This is due to the fact that the blood flow velocity in that area is very low and M2D TSE imaging only works well for a sufficiently large blood flow velocity. It can be concluded by the detecting module 13 that this area 14 is insufficiently similar to the bright lumen area 17 in the 3D BTFE image 10 shown in FIG. 2. This area 14 must therefore not be included into the registration process. The masking module 18 therefore creates an according exclusion mask as described below.

Figure 5:
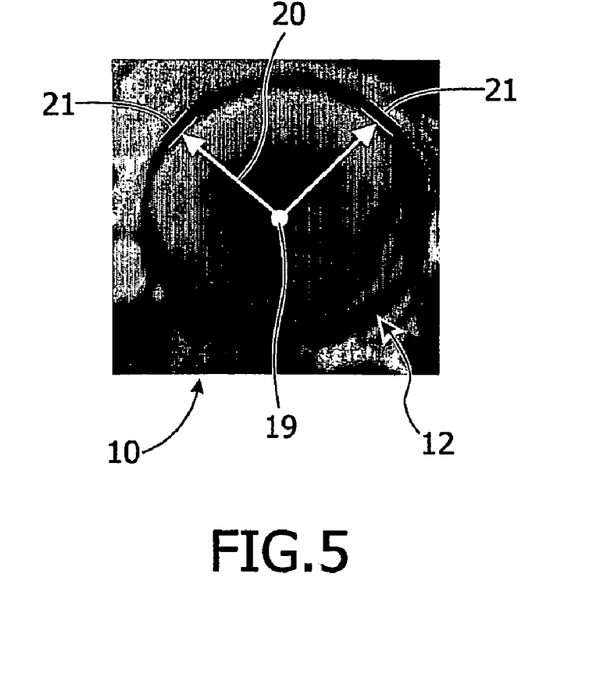
FIG. 5 shows a schematic picture of an estimation of the radius of the aorta.
Figure 6:
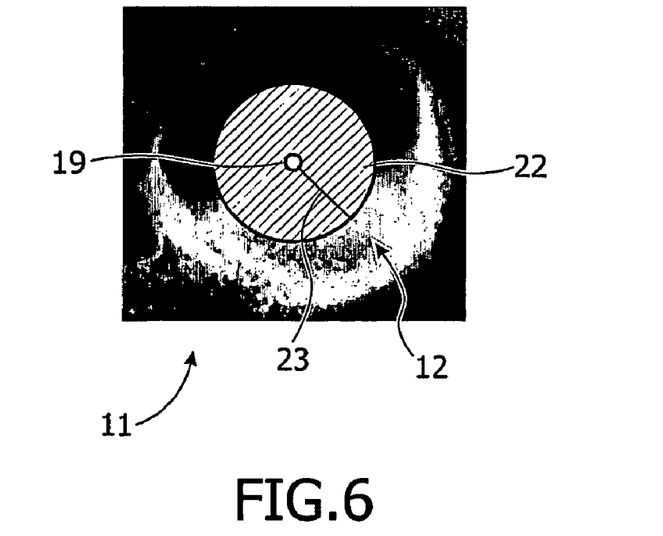
FIG. 6 shows a schematic picture of a definition of the first part of an exclusion mask.

The area 14 in the M2D TSE image 11 with the flow artifact is included in the exclusion mask by means of the masking module 18. For this purpose an estimate of the radius 20 of the aorta 12 is made for each slice on the basis of the 3D BTFE images 10, as illustrated in FIG. 5. The dark black ring in the images 10 is used as a feature for detecting the approximate position, of the aorta wall 21. On the basis of the detected radius 20; a first exclusion mask 22 is defined around the centerline 19 in the M2D TSE image 11 to cover the brighter central area 14'. The radius 23 of this part of the mask is about 50 percent of the aorta's diameter as shown in FIG. 6. In other embodiments another percentage might be used. This procedure has been implemented in the computer program 5 as a predetermined scheme for images with tubular objects like vessels. In a preferred embodiment of the invention the kind and/or shape of each object depicted in the images is determined by the processor 5 before the detecting process starts. In this case the best fitting predetermined scheme can be selected for creating the exclusion mask.

Figure 7:
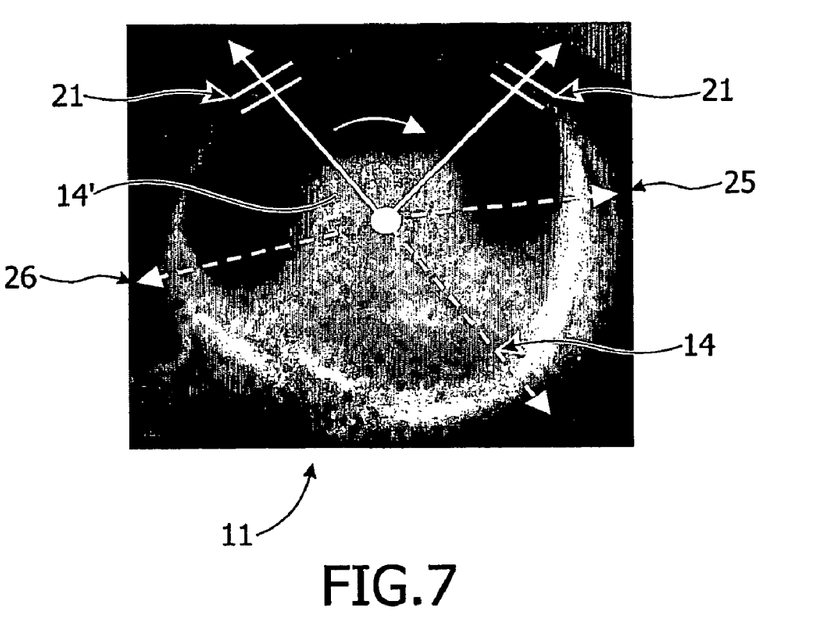
FIG. 7 shows a schematic picture of a radial inspection to extend an exclusion mask.
Figure 8:
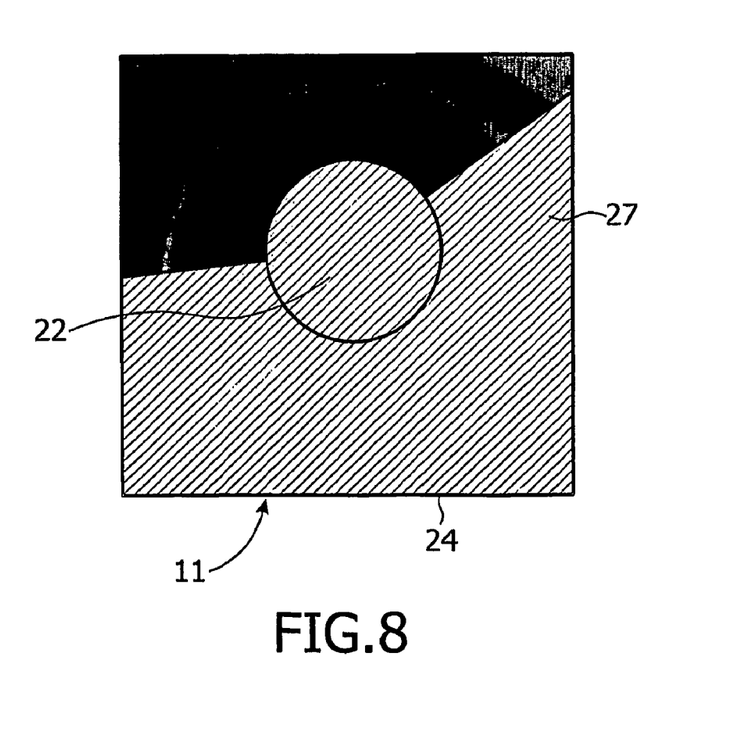
FIG. 8 shows a schematic picture of the final exclusion mask.

In a next step, the M2D TSE image 11 is "radially inspected" using the aorta wall 21 as a guidance, see FIG. 7. In other words an image processing is carried out for all pixels within the aorta wall 21. Depending on the results of this processing the first part 22 of the exclusion mask is extended to the final exclusion mask 24 by adding an extension part 27, if one or more of the following criteria are fulfilled: (a) the intensity encountered on a radius 20 is "not black", i.e. above a certain threshold of pixel intensity, see the area 14 on the lower right of the aorta; (b) the intensity encountered near the aorta wall 21 is too high, e.g. due to the presence of thrombus, see the area 25 on the middle right of the aorta; (c) the aorta wall 21 is too thick, i.e. above a certain threshold, see the area 26 on the middle left of the aorta 12. For this purpose the masking module 18 uses computer instructions adapted to compare data obtained from the images 10, 11 with pre-defined threshold data, pattern and/or schemes. The finally resulting exclusion mask 24 is shown in FIG. 8. Only the upper part of the image 11 is not covered by the exclusion mask. All other pixels have been included into the final exclusion mask 24 and therefore will not be used in the registration process.

In a subsequent step a registration between image areas which are not included in the exclusion mask 24 is performed, i.e. during the registration only image pixels outside the exclusion mask 24 are used for the calculation of the similarity between the images 10, 11. For this purpose the processor 4 running the computer program 5 serves as a registration module 28. Although in FIG. 8 only a certain part around the aorta 12 is shown all image pixels/voxels that are not masked out are included within the registration process.

During this registration an iterative deforming of one of the images by means of e.g. rotation, translation, scaling or local non-rigid deformation and a calculation of similarities is performed. The objective of this iterative process is to find the optimal deformation, leading to the largest similarity. These steps are performed within the processor 4 by means of an according computer program using known techniques, such as described in "Medical Image Registration" by Hajnal, Hill and Hawkes, CRC Press, ISBN 0-8493-0064-9.

Figure 9:
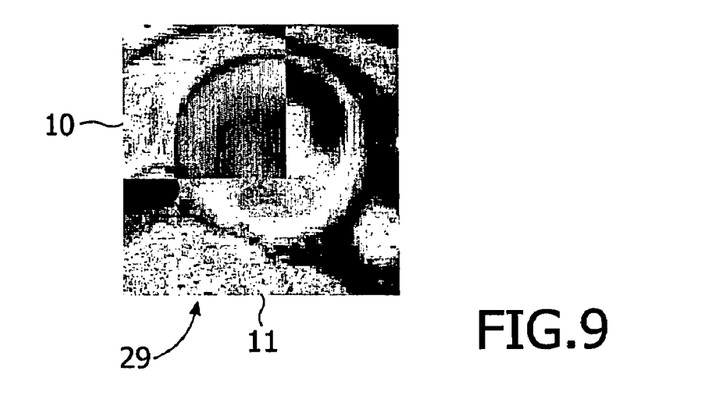
FIG. 9 shows a part of the 3D BTFE image together with the registered M2D TSE image.
Figure 10:
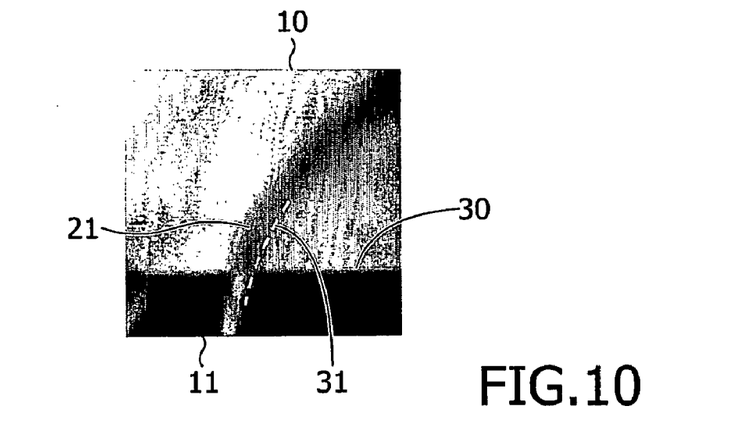
FIG. 10 shows an enlarged part of the images in FIG. 9 using an exclusion mask.
Figure 11:
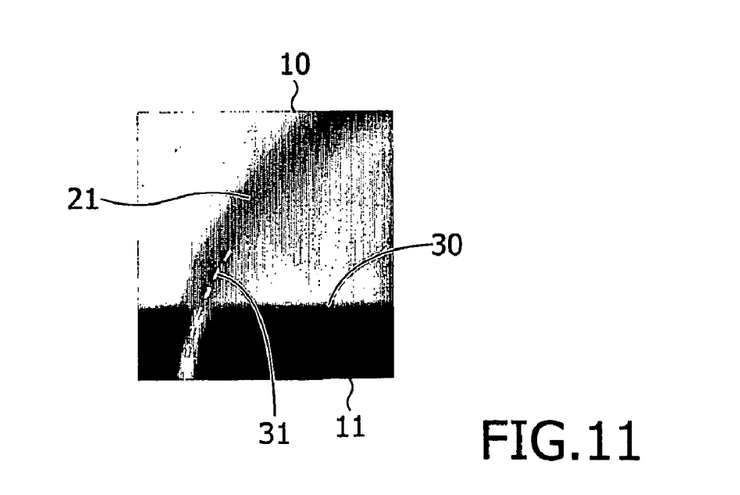
FIG. 11 shows an enlarged part of the images in FIG. 9 without using an exclusion mask.

In FIG. 9 a composed image 29 is shown which is composed of a part of the 3D BTFE image 10 in the upper left corner and a part of the M2D TSE image 11. FIGS. 10 and 11 show an enlarged part of the composed image 29. In the enlarged image a part of the aorta wall 21 is shown, the aorta wall 21 proceeds across the borderline 30 between the two images 10, 11. FIG. 10 show the result of a rigid image registration using an automatically detected exclusion mask 24. The dashed white reference line 31 illustrates the inner side of the aorta wall 21 in the M2D TSE image 11 and can be used to assist the visual assessment of the registration quality. In FIG. 10 the inner side of the aorta wall 21 corresponds with the reference line 31 in the 3D BTFE image 10 as well as in the M2D TSE image 11. For comparison, FIG. 11 shows the result of a registration without using the exclusion mask 24, i.e. using the complete image 11 during registration. As it can be seen using the reference line 31, relating to the 3D BTFE image 10 the M2D TSE image 11 is slightly moved to the right. The reference line 31 does not define the inner side of the aorta wall 21 but is situated within the wall. As illustrated in FIG. 10 the exclusion of the non-similar areas leads to a better match between the registered 3D BTFE and M2D TSE images 10, 11.

Preferably, but not necessarily, all steps of the procedure described above are carried out automatically using appropriate algorithms in form of a computer program 5. The embodiment described above can preferably be applied to tubular objects, like vessels. If the images to be matched show other objects, the algorithms used for carrying out the invention have to be adapted accordingly.

Although the invention has been described above using a three-dimensional example, it is applicable as well for two-dimensional imaging (i.e. the registration of only two different images).

Preferably the registration system 1 uses a large database of examples of prior detecting, masking and registration processes in order to carry out the present invention. From this database algorithms, schemes etc. are taken in order to provide an adequate registration for each kind of input data. For example the database may include a list, describing which kind of artifacts are most common for a special type of images. In other words a so called computer-aided detection/registration system is used. In some cases a user interaction might be necessary in order to guide the process. For example a user might define start and end points of the centerline of a vessel etc.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. It will furthermore be evident that the word "comprising" does not exclude other elements or steps, that the words "a" or "an" does not exclude a plurality, and that a single element, such as a computer system or another unit may fulfill the functions of several means recited in the claims. Any reference signs in the claims shall not be construed as limiting the claim concerned.

| LIST OF REFERENCE NUMERALS: | |
| --- | --- |
| 1 | registration system |
| 2 | computer |
| 3 | monitor |
| 4 | processor |
| 5 | computer program |
| 6 | input/output interface |
| 7 | memory |
| 8 | imaging data |
| 9 | external storage device |
| 10 | 3D BTFE image |
| 11 | M2D TSE image |
| 12 | Aorta |
| 13 | Detecting module |
| 14 | bright area |
| 15 | dark area |
| 16 | area with standard intensity |
| 17 | area with standard intensity |
| 18 | masking module |
| 19 | central vessel axis |
| 20 | radius |
| 21 | aorta wall |
| 22 | first exclusion mask |
| 23 | mask radius |
| 24 | final exclusion mask |
| 25 | thrombus area |
| 26 | thick wall area |
| 27 | extension mask |

LIST OF REFERENCE NUMERALS:

| | |
|---|---|
| 28 | registration module |
| 29 | composed image |
| 30 | borderline |
| 31 | reference line |

The invention claimed is:

1. A system for registration of medical images, comprising:
a processor adapted to detect one or more image areas in a first image, the image areas being insufficiently similar to corresponding image areas of a second image, wherein the first and second images include a same portion of a same vessel, the first image is acquired using a first imaging protocol and the second image is acquired using a second different imaging protocol, the one or more image areas and the corresponding image areas are areas within the vessel, and the areas of the first image that are insufficiently similar to the corresponding image areas of a second image are insufficiently similar in pixel intensity, wherein one or more image areas within the vessel in the second image and one or more corresponding image areas within the vessel in the first image have similar pixel intensity;
the processor further adapted to create at least one exclusion mask to specify image pixels or voxels belonging to these insufficiently similar image areas;
the processor further adapted to determine a centerline of the corresponding region of interest of the second image;
the processor further adapted to determine a radius of the corresponding region of interest in the second image from the centerline;
the processor further adapted to copy the determined centerline to the first image, wherein the processor creates that at least one exclusion mask in the first image as a region about the copied centerline having a radius less than the determined radius;
the processor further adapted to identify a wall of the region of interest from the copied centerline in first image, wherein the wall is away from the copied centerline by a distance about equal to the determined radius;
the processor further adapted to determine a thickness of the wall and
extend at least a sub-portion of the at least one exclusion mask beyond the wall in response to the thickness of the wall exceeding a predetermined wall thickness; and
the processor further adapted to perform a registration between image areas of the first image which are not included in the exclusion mask and corresponding image areas of the second image.

2. The system as claimed in claim 1, wherein the processor is adapted to automatically detect insufficiently similar areas by comparing pixel or voxel intensities of corresponding image areas in the images.

3. The system as claimed in claim 1, wherein the processor is adapted to create at least one part of the exclusion mask using a predetermined masking scheme, the masking scheme depending on image attributes.

4. A computer readable medium encoded with computer executable instructions, which, when executed by a processor, causes the processor to:
detect one or more image areas in a region of interest in a first image that are insufficiently similar to corresponding image areas in a corresponding region of interest in a second image, wherein the first and second images include a same portion of a same vessel, the first image is acquired using a first imaging protocol and the second image is acquired using a second different imaging protocol, the one or more image areas and the corresponding image areas are areas within the vessel, and the areas of the first image that are insufficiently similar to the corresponding image areas of a second image are insufficiently similar in pixel intensity, wherein one or more image areas within the vessel in the second image and one or more corresponding image areas within the vessel in the first image have similar pixel intensity;
create an exclusion mask in the first image, the exclusion mask including image pixels or voxels of the detected one or more image areas;
determine a centerline of the corresponding region of interest of the second image;
determine a radius of the corresponding region of interest in the second image from the centerline;
copy the determined centerline to the first image, wherein the processor creates that at least one exclusion mask in the first image as a region about the copied centerline having a radius less than the determined radius;
identify a wall of the region of interest from the copied centerline in first image, wherein the wall is away from the copied centerline by a distance about equal to the determined radius;
determine a pixel intensity near the wall; and
extend at least a sub-portion of the at least one exclusion mask beyond the determined radius only in response to the pixel intensity exceeding a predetermined pixel intensity; and
perform a registration between image areas of the first image which are not included in the exclusion mask and corresponding image areas of the second image using the exclusion mask.

5. The system as claimed in claim 1, wherein the processor determines a radius of the corresponding image areas of the second image.

6. The system as claimed in claim 5, wherein the processor defines the mask based on the determined radius.

7. The system as claimed in claim 6, wherein the processor creates an initial exclusion mask in the first image having a radius that is less than the determined radius and extends at least a sub-portion of the exclusion mask radius beyond the determined radius in response to a pixel intensity encountered at or about the determined radius exceeding a predetermined pixel intensity threshold.

8. The computer readable medium of claim 4, wherein the instructions, which, when executed by a processor, further cause the processor to:
determine a pixel intensity about the determined radius in the first image; and
extend at least a sub-portion of the at least one exclusion mask up beyond the determined radius in response to the pixel intensity exceeding a predetermined pixel intensity.

9. The computer readable medium of claim 4, wherein the first image is a black blood image and the one or more image areas of the region of interest in the first image include blood flow artifact.

10. A computer readable medium encoded with computer executable instructions, which, when executed by a processor, causes the processor to:

detect one or more image areas in a region of interest in a first image that are insufficiently similar to corresponding image areas in a corresponding region of interest in a second image;
create an exclusion mask in the first image, the exclusion mask including image pixels or voxels of the detected one or more image areas;
determine a centerline of the corresponding region of interest of the second image;
determine a radius of the corresponding region of interest in the second image from the centerline;
copy the determined centerline to the first image, wherein the processor creates that at least one exclusion mask in the first image as a region about the copied centerline having a radius less than the determined radius;
identify a wall of the region of interest from the copied centerline in first image, wherein the wall is away from the copied centerline by a distance about equal to the determined radius;
determine a thickness of the wall; and
extend at least a sub-portion of the at least one exclusion mask beyond the wall only in response to the thickness of the wall exceeding a predetermined wall thickness; and perform a registration between image areas of the first image which are not included in the exclusion mask and corresponding image areas of the second image using the exclusion mask.

11. The computer readable medium of claim 10, the computer executable instructions, which, when executed by the processor, further cause the processor to:
determine a pixel intensity near the wall; and
extend at least a sub-portion of the at least one exclusion mask beyond the determined radius only in response to the pixel intensity exceeding a predetermined pixel intensity.

12. The computer readable medium of claim 11, the computer executable instructions, which, when executed by the processor, further cause the processor to:
determine a pixel intensity in the first image at a distance about equal the determined radius; and
extend at least a sub-portion of the at least one exclusion mask up beyond the determined radius in response to the pixel intensity exceeding a predetermined pixel intensity.

13. The system of claim 1, wherein the processor employs the exclusion mask during segmentation to indicate the image areas that are not included in the exclusion mask.

\* \* \* \* \*